E. S. BECK.
ELECTRIC CIRCUIT OPENING DEVICE.
APPLICATION FILED NOV. 30, 1909.
999,735.
Patented Aug. 8, 1911.
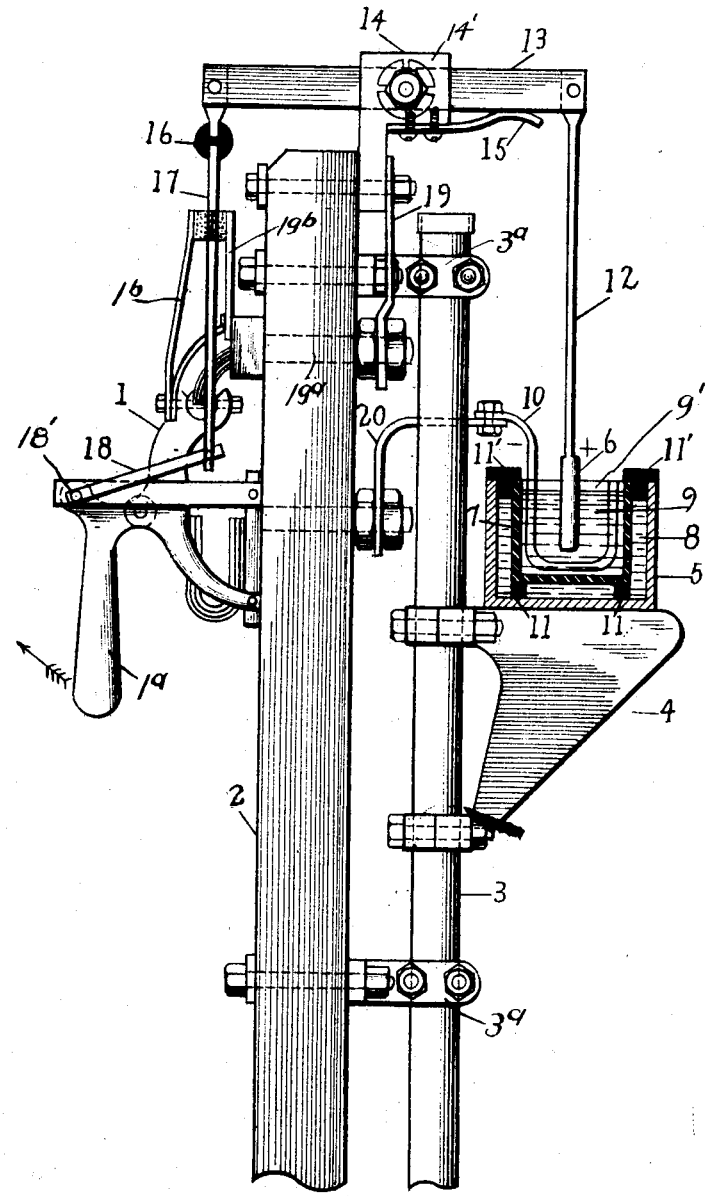
WITNESSES
INVENTOR
Edgar S. Beck

UNITED STATES PATENT OFFICE.

EDGAR S. BECK, OF TREICHLERS, PENNSYLVANIA.

ELECTRIC-CIRCUIT-OPENING DEVICE.

999,735.  Specification of Letters Patent.  Patented Aug. 8, 1911.

Application filed November 30, 1909. Serial No. 530,664.

*To all whom it may concern:*

Be it known that I, EDGAR S. BECK, a citizen of the United States, a resident of Treichlers, in the county of Northampton, in the State of Pennsylvania, have invented or discovered new and useful Improvements in Electric-Circuit-Opening Devices, which are more fully described and claimed in the annexed specification.

This invention relates to improvements in circuit breaking devices and the leading object of the invention is to provide a device wherein an electrolyte and a pair of electrodes are employed, one of said electrodes being removable from the electrolyte and the other being secured therein, and an improved connection between the movable electrode and a manually operated switch, whereby the removable electrode will be withdrawn from the electrolyte by operating the manual switch.

Another object of the invention is to provide an improved cell for the electrodes, whereby the removable electrode may be withdrawn without the formation of an arc.

With the above and other objects in view the invention relates to certain constructions, combinations and arrangements of parts clearly described in the following specification and clearly illustrated in the accompanying drawing, in which the figure is a side elevation with parts shown in section.

Referring to the accompanying drawings 1 denotes a manual circuit breaker which is supported on a standard or board 2. A second support 3 is secured by the clamping device 3ª to the first support or board 2, and said second support 3 has a bracket 4 secured thereto, which serves as a support for the outer cell 5. The outer cell 5 contains an insulating oil 8 and an inner cell 7, which is formed of rubber or other insulating material and is held in spaced relation to said outer cell 5 by means of insulating plugs 11 located between the bottoms of the inner and outer cells and insulating plugs 11′ located between the upper edges of the outer and inner cells. The inner cell contains an electrolyte and an insulating oil 9′ which floats on the electrolyte 9.

A negative electrode 10, which is formed with a U-shaped lower end is submerged in the electrolyte 9 and its upper end is connected to the conductor 20. A positive electrode 6 is submerged in the electrolyte 9 and connects with a depending rod 12 which is pivoted at its upper end to the horizontal lever 13 which is pivotally mounted at 14 to the upstanding arm 14′, carried by the support or board 2. The upstanding arm 14′ has secured thereto a spring 15 which has an upturned outer end to engage the lever 13 and which spring is adapted to counter-act the weight of the electrode 6 and the connecting rod 12. The other end of the lever 13 is connected to an insulating member 16 which in turn is connected to a depending link 17, which has its lower end pivoted to a second link 18, the outer end of which link is pivoted at 18′ to the lever 1ª of the manual circuit breaker 1. The upstanding arm 14′ is connected with a conductor 19 which in turn connects with a bolt 19ª that passes through the support 2 and which supports on its outer end a contact member 19ᵇ which is adapted to engage a contact member 1ᵇ carried by the lever 1ª.

When the lever 1ª is moved in an arc upwardly in the direction of the arrow shown in the drawing the depending link 17 will be moved downwardly and the electrode 6 will be withdrawn from the electrolyte 9 and consequently the circuit will be broken. A carbon or an aluminum plate is preferred for the positive electrode and the depending connecting rod 12 should be of aluminum to lighten the weight thereof. Normally the current does not flow through the electrodes 6 and 10 and only flows through said electrodes when the manual circuit breaker has opened so that the normal path of the current has been interrupted, the electrodes then temporarily receive the load of the current until the positive electrode 6 has been withdrawn.

Having described my invention I claim:

In a circuit breaker, a cell having an electrolyte, a stationary negative electrode therein, a positive electrode removable from said electrolyte, an insulating oil disposed in said cell over the electrolyte, a support, a lever mounted for pivotal movement on said support, a depending link connecting said positive electrode and lever, a spring adapted to exert pressure against the lever to lift the positive electrode and connecting link, an insulated link connected with the lever, a manually operated switch, a link connecting the insulated link and said manually operated switch, and electrical connections for said electrodes and switch.

In witness whereof, I subscribe my signature in the presence of two witnesses.

EDGAR S. BECK.

Witnesses:
BENJ. F. HALL,
ELVIN D. NEWHART.